United States Patent [19]
Granestrand

[11] Patent Number: 4,917,449
[45] Date of Patent: Apr. 17, 1990

[54] METHOD OF DISPOSING A POLARIZATION DIRECTING OPTOELECTRONIC COUPLER AND A COUPLER FOR CARRYING OUT THE METHOD

[75] Inventor: Per O. Granestrand, Tyresö, Sweden
[73] Assignee: Telefonaktiebolaget L M Ericsson, Stockholm, Sweden
[21] Appl. No.: 270,264
[22] Filed: Nov. 14, 1988

[30] Foreign Application Priority Data

Nov. 20, 1987 [SE] Sweden ............................... 8704606
May 27, 1988 [SE] Sweden ............................... 8801991
May 27, 1988 [SE] Sweden ............................... 8801992

[51] Int. Cl.[4] .......................... G02B 6/10; G02B 6/00
[52] U.S. Cl. ............................. 350/96.14; 350/96.13; 350/320
[58] Field of Search ............... 350/96.11, 96.12, 96.13, 350/320, 96.14, 96.15

[56] References Cited

U.S. PATENT DOCUMENTS

| | | | |
|---|---|---|---|
| 4,012,113 | 3/1977 | Kogelnik et al. | 350/96.13 |
| 4,070,092 | 1/1978 | Burns | 350/96.14 X |
| 4,127,320 | 11/1978 | Li | 350/96.13 |
| 4,157,860 | 6/1979 | Marcatili | 350/96.14 |
| 4,160,579 | 7/1979 | Milton | 350/96.14 |
| 4,291,939 | 9/1981 | Giallorenzi et al. | 350/96.14 |
| 4,390,236 | 6/1983 | Alferness | 350/96.14 |
| 4,533,207 | 8/1985 | Alferness | 350/96.14 |
| 4,711,515 | 12/1987 | Alferness | 350/96.14 |
| 4,756,588 | 7/1988 | Granestrand | 350/96.14 |
| 4,832,431 | 5/1989 | Nolting et al. | 350/96.14 |
| 4,850,667 | 7/1989 | Djubsjöbacka | 350/96.14 |
| 4,856,094 | 8/1989 | Heidrich et al. | 350/96.13 |

FOREIGN PATENT DOCUMENTS

2179465 3/1987 United Kingdom ......... 350/96.14 X

OTHER PUBLICATIONS

"Switched Directional Couplers with Alternating $\Delta\beta$", IEEE Journal of Quantum Electronics, vol. QE-12, No. 7, Jul. 1976, H. Kogelnik et al.
"Modulation Behavior of Integrated Optical Directional Couplers", Journal of Optical Communications 5 (1984), pp. 122-131, H. F. Schlaak.
"Ferroelectric Lithium Niobate", J. Phys. Chem. Solids (1966), vol. 27, pp. 997-1012, Abrahams et al.
"LiNbO$_3$ Directional-Coupler Polarization Splitter", Electronics Letters, Jun. 4, 1987, vol. 23, No. 12, pp. 614-616.
"Low-Cross-Talk Waveguide Polarization Multiplexer/Demultiplexer for $\lambda=1.32$ $\mu$m", Optics Letters, vol. 10, No. 4, Apr. 1984, pp. 140-142, R. C. Alferness et al.
"Polarization-Insensitive Integrated-Optical Switches: A New Approach", IEE Journal of Quantum Electronics, vol. QE-17, No. 6, Jun. 1981, pp. 959-964, Tsukada et al.
"Low-Loss Polarization-Independent Electrooptical Switches at $\lambda=1.3$ $\mu$m", Journal of Lightwave Technology, vol. LT-2, No. 1, Feb. 1984, Leon McCaughan.
"Polarization-Independent Optical Directional Coupler Switch Using Weighted Coupling", Appl. Phys. Lett. 35 (10), Nov. 15, 1979, pp. 748-750, R. C. Alferness.

Primary Examiner—William L. Sikes
Assistant Examiner—Brian M. Healy
Attorney, Agent, or Firm—Burns, Doane, Swecker & Mathis

[57] ABSTRACT

Polarization directing optoelectronic coupler on a wafer of doubly refracting material with an optical axis (L1). The coupler has an interaction region (L1) with waveguides (L1) and an electrode means. The interaction region (L1) is divided into two sections with a central electrode and two outer electrodes in each section. Voltage sources are connected to the electrodes and generate electrical fields through the waveguides. The electrical field between the outer electrodes has in each section the same direction in both waveguides and achieves an $\Delta H$ modulation. The electrical field between the central electrode and outer electrodes has mutually reverse direction in both waveguides in the sections and achieves a $\Delta\beta$ modulation. For an arbitrarily polarized lightwave both the crossover state and the bar state can be achieved for both the TE and TM modes or one of its oscillation modes can be crossed over and the other of its oscillation modes can be coupled straight through. The directional coupler can be driven at low voltages and the required manufacturing accuracy is relatively low.

19 Claims, 11 Drawing Sheets

METHOD OF DISPOSING A POLARIZATION DIRECTING OPTOELECTRONIC COUPLER AND A COUPLER FOR CARRYING OUT THE METHOD

TECHNICAL FIELD

The present invention relates to a method of disposing a polarization directing optoelectronic coupler, including a single crystal wafer of doubly refracting material with an optical axis, an elongate interaction region at the upper surface of the wafer divided into at least two transverse sections, two optical waveguides extending in the interaction region at mutual spacing in the longitudinal direction thereof, and an electrode means arranged in the interaction region, the electrode means in each of the sections having at least three electrodes extending along the waveguides over substantially the entire length of their respective section, and having connections for electrical voltage sources, the optical axis being directed in the transverse direction of the waveguides, with the latter extending in the Y direction of the crystal for switching lightwaves, the orthogonal polarization directions of which have arbitrary mutual strengths, and a coupler for carrying out the method.

BACKGROUND ART

Components in integrated optics, e.g. couplers and modulators can be included in fibre-optical systems for information transmission. These components include a wafer of opto-electrical material having optical waveguides indiffused into its upper surface. In a coupler, for example, a transmitted light signal can be switched or crossed over to either of the coupler's outputs with the aid of electrodes on the surface of the wafer. The components generally have the disadvantage that light with well-defined polarization is required for this switching to take place satisfactorily. If the polarization state is indefinite the transmitted signal can be split up between the outputs so that a fault in the signal transmission occurs in the coupler. A well-defined polarization state in transmitted light signals can be maintained if the transmission takes place with polarization-maintaining optical fibres, although these attenuate the light signals rather heavily and are expensive. These difficulties in transmission can be avoided by the optical components being made polarization-independent. In Appl. Phys. Lett. 35(10), Nov. 15, 1979, pp 748–750, R. C. Alferness; "Polarization-Independent Optical Directional Coupler Switch using Weighted Coupling" there is proposed a polarization-independent optical directional coupler, in which the distance between the optical waveguides varies in the interaction region of the coupler. This directional coupler has the disadvantage that it requires great accuracy in manufacture of the optical wave guides and electrodes. In the Journal of Lightwave Technology, Vol. LT-2 No. 1, Feb., 1984, Leon McCaughan "Low-Loss Polarisation-Independent Electro-Optical Switches at $\lambda = 1,3$ $\mu$m", a polarization-independent optical coupler is suggested which is somewhat simpler than in the preceding reference, but which has greater crosstalk between the optical waveguides. A further polarization-independent optical coupler is suggested in IEEE Journal of Quantum Electronics, Vol. QE17, No. 6, June 1981, pp 959–964, N. Tsukada and T. Nakayama; "Polarization-Insensitive Integrated-Optical Switches: A New Approach". In this publication there is described a coupler having two sections in the interaction region with two separate types of electrodes. These electrodes are each divided into a large number of smaller electrodes, and the directional coupler is complicated in manufacture. Apart from the above-mentioned disadvantages with large complexity and high demands on manufacturing accuracy, many known polarization-independent optical directional couplers also have the disadvantage that they require high drive voltages. This can be a difficulty in many applications.

The above mentioned problem, that a transmitted light signal has an indefinite polarization state can also be solved by splitting a received lightwave into two signals with orthogonal polarization states, each being processed by itself in a receiver. Apparatus for achieving such lightwave splitting is described in Optical Letters, Vol. 10, No. 4, 1984 pp 140–142, R. C. Alferness and L. L. Buhl: "Low Crosstalk Waveguide Polarization Multiplexer/Demultiplexer for $\lambda = 1.32$ $\mu$m" and in Electronics Letters, Vol. 23 1987, pp 614–616, K. Habara: "LiNbO$_3$ Directional Coupler Polarization Splitter". Such apparatus includes directional couplers of lithium nobiate having light propagation at right angles to the optical axis of the single crystal wafer pertaining to the coupler. In this crystal orientation the two orthogonal polarization directions, i.e. the TM and TE modes, have different propagation constants in the coupler waveguides. The bar state for one mode and the crossover state for the other mode can be obtained by connecting a suitable voltage to the coupler electrodes. These known apparatus require great manufacturing accuracy, however, for obtaining good splitting of the polarization directions, and the apparatus are therefore expensive.

SUMMARY OF THE INVENTION

The above-mentioned disadvantages are avoided by disposing a polarization splitting/combining or polarization independent optoelectronic directional coupler with the use of a method in accordance with the invention. This disposition takes place with moderate drive voltages, and a coupler for carrying out the method has electrodes and optical waveguides of simple embodiment, and can be produced with low requirements on manufacturing accuracy.

The invention has the characterizing features disclosed in the accompanying claims.

BRIEF DESCRIPTION OF DRAWINGS

Embodiment examples of an inventive directional couplers will now be described in more detail in connection with the drawings, in which.

BEST MODE FOR CARRYING OUT THE INVENTION

Figure 1:
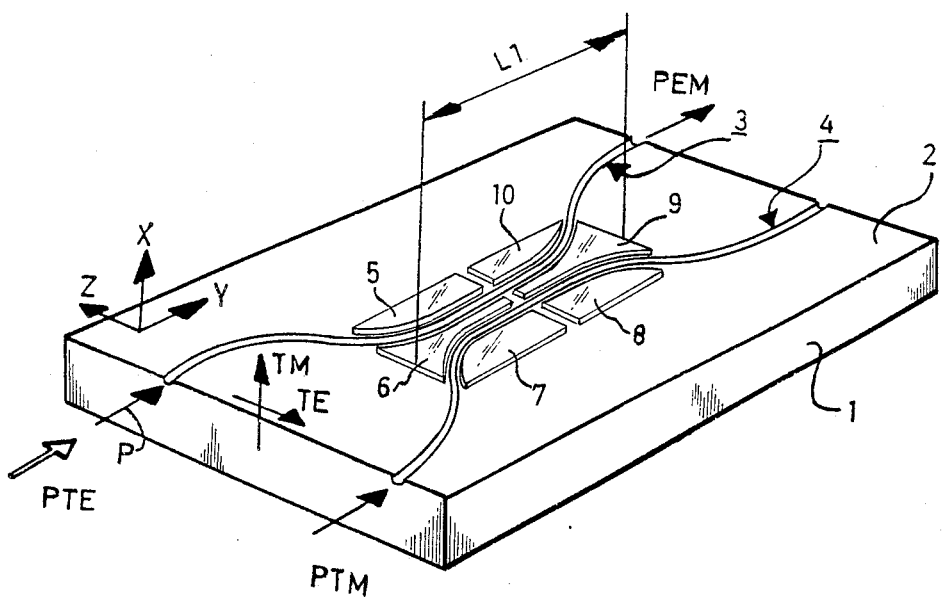
FIG. 1 is a perspective view seen from above illustrating a directional coupler.
Figure 5:
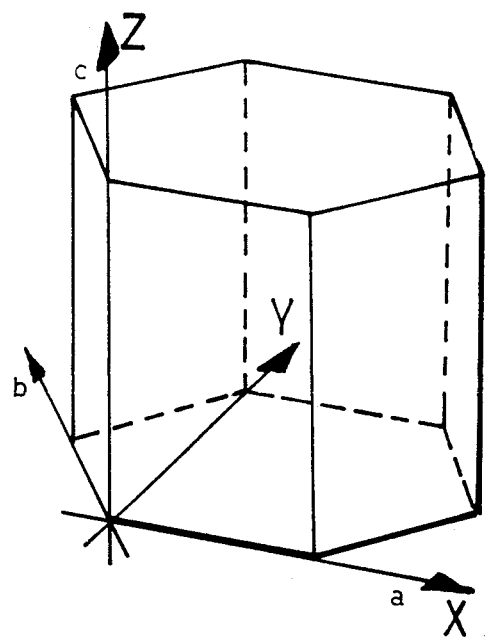
FIG. 5 is a schematic perspective view of a unit cell for the crystal structure of the lithium niobate, FIG. 6, FIG. 7

A polarization splitting/combining optoelectronic coupler in accordance with the invention is schematically illustrated in a perspective view in FIG. 1. A single crystal wafer 1, e.g. of lithium niobate or lithium tantalate, has two optical waveguides 3 and 4 on its upper surface 2. The coupler has six electrodes denoted by numerals 5, 6, 7, 8, 9 and 10 in an elongate interaction region with a length L1, the waveguides lying relatively close to each other in this region. A lightwave P incident in the input of the waveguide can be coupled to the output of either waveguide 3 or 4 with the aid of the electrodes. The lightwave is arbitrarily polarized and contains the orthogonal oscillation modes TE and TM of the light, both of which can be switched as will be described in more detail below. An XYZ coordinate system denotes the crystal directions of the wafer 1. The crystal structure of the wafer material is illustrated schematically in FIG. 5. The orientation of the right-angular coordinate system XYZ is shown here also, in relation to the hexagonal unit cell system normally used for the material with its associated crystallographic a,b,c coordinate system. The axes in this coordinate system have been selected so that the X axis points in the direction of the crystallographic a axis and the Z axis in the direction of the crystallographic c axis, which is the optical axis. A more detailed description of the crystal structure for lithium niobate is to be found, for example in J. Phys. Chem. Solids, Pergamon Press 1966, Vol. 27, pp. 997–1012, "Ferroelectric Lithium Niobate.3.Single Crystal X-ray Diffraction Study at 24° C.

Figure 2:
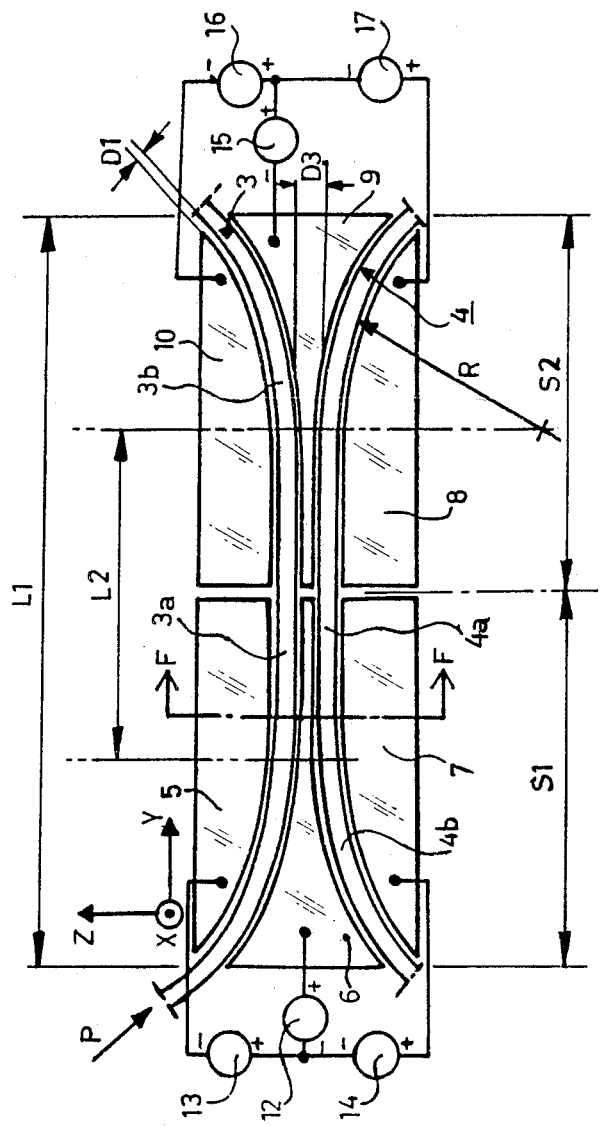
FIG. 2 is a plan view from above of the interaction region of the directional coupler with its electrodes and optical waveguides.

FIG. 2 shows in more detail the appearance of the electrodes and waveguides in the interaction region for the directional coupler in the selected embodiment. The central portion of the interaction region, this region having a length of L2, contains the portions 3a and 4a of the waveguides 3 and 4, these portions being mutually parallel. The space between the waveguide portions 3a and 4a has a width D3 in the central portion of the interaction region. At both ends of this region the waveguides 3 and 4 have diverging arcuate parts 3b and 4b. The arcuate parts 3b and 4b are here in the form of circular arcs with a radius R. Of the six electrodes 5–10, two central electrodes 6 and 9 are in the space between the waveguides, two outer electrodes 5 and 10 on one side of the waveguides 3 and 4 and two outer electrodes 7 and 8 on the other side of both waveguides. The electrodes are mirror-symmetrical about a centre line through the interaction region transverse to the parallel portions 3a and 4a of the waveguides. This central line divides the electrodes into two sections S1 and S2, with one section at each end of the interaction region. Those of the longitudinal edges of the electrodes 5–10 facing towards one of the waveguides 3 or 4 accompany the contour lines of the waveguides. The edges of the electrodes are at a small distance from these contour lines so that a region with a width D1 of about 1 μm arises between the electrodes and the waveguides.

Figure 3:
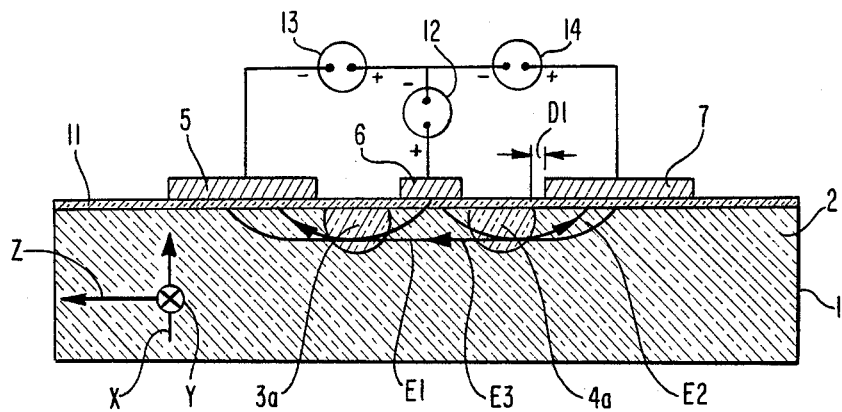
FIG. 3 is a cross section of the directional coupler in the interaction region.

In FIG. 3 there is a cross section of the coupler according to FIGS. 1 and 2. The cross section is taken in a section F—F through the electrodes 5, 6 and 7 and through the parallel portions 3a and 4a of the waveguides 3 and 4. As mentioned, these are indiffused in the upper surface of the wafer 1, this surface being coated with a buffer layer 11 of such as quartz. The electrodes of the coupler lie above the buffer layer 11, and one electrode section S1 containing the electrodes 5, 6 and 7 is illustrated in the figure. A voltage source 12 has its positive pole connected to the central electrode 6 and its negative pole connected both to the positive pole of a voltage source 13 and to the negative pole of a voltage source 14. The voltage source 13 has its negative pole connected to the outer electrode 5 and the voltage source 14 has its positive pole connected to the outer electrode 7. The voltage sources generate between the electrodes a first electrical field E3 and a second electrical field E1, E2 through the waveguides 3 and 4. The electrodes 8, 9 and 10 in the other electrode section S2 are connected to voltage sources, as illustrated in FIG. 2. A voltage source 15 has its negative pole connected to the central electrode 9 and its positive pole connected both to the positive pole of a voltage source 16 and to the negative pole of a voltage source 17. The voltage source 16 has its negative pole connected to the outer electrode 10, and the voltage source 17 is connected by its positive pole to the outer electrode 8. These voltage sources generate electrical fields through the wave guides 3 and 4 in a corresponding manner as do the voltage sources 12, 13 and 14 according to the description relating to FIG. 3 above.

Figure 4A:
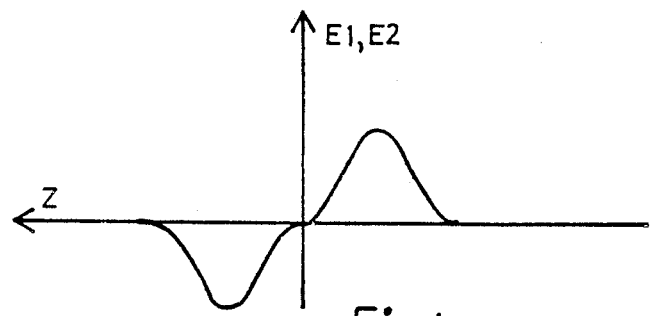
FIG. 4a, 4b and 4c are diagrams showing the electric fields through the optical waveguides.
Figure 4B:
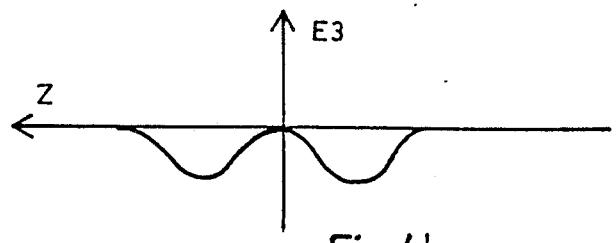
Figure 4C:
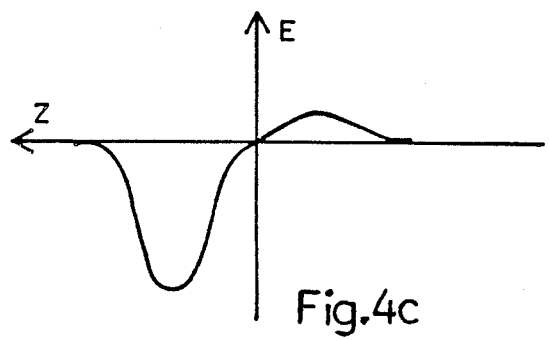

In FIG. 4a the appearance of the second electrical field E1, E2 in the portions 3a and 4a is illustrated in more detail. FIG. 4b illustrates the appearance of the first electrical field E3 in these waveguides, and FIG. 4c illustrated the sum field E of the electric fields E1, E2 and E3. The direction of the abscissa in the three diagrams coincides with the above-mentioned Z axis. The second electrical field E1 and E2, which is generated by the voltage source 12, achieves an asymmetric disturbance of the light propagation constants in the waveguides. This disturbance gives rise to a so-called $\Delta\beta$ modulation of the coupler, e.g. as described in Journal of Optical Communications, 5(1984) 4, pp 122–131, H. F. Schlaak: "Modulation Behaviour of Integrated Optical Directional Couplers". The first field E3 achieves a uniform disturbance of the light propagation constants and gives rise to a so-called $\Delta H$ modulation of the coupler, which is also described in the mentioned reference (Journal of Optical Communications). The electrical fields through the arcuate parts 3b and 4b of the waveguides have substantially the same appearance as in FIGS. 4a, 4b and 4c. However, crossover between the waveguides is affected by their mutual spacing, and by successively changing the spacing a weighted coupling between the waveguides is achieved. This weighted coupling is described, e.g. in Appl. Phys. Lett. 35(10), 15 Nov. 1979, pp 748–750R. C. Alferness: "Polarization Independent Optical Directional Coupler Switch using Weighted Coupling". The illustrated electrical fields E1, E2 and E3 in section S1 of the coupler are corresponded to by electrical fields in the section S2, although the voltage source 15 here has reverse polarity to the voltage source 12 in section 1.

Figure 6:
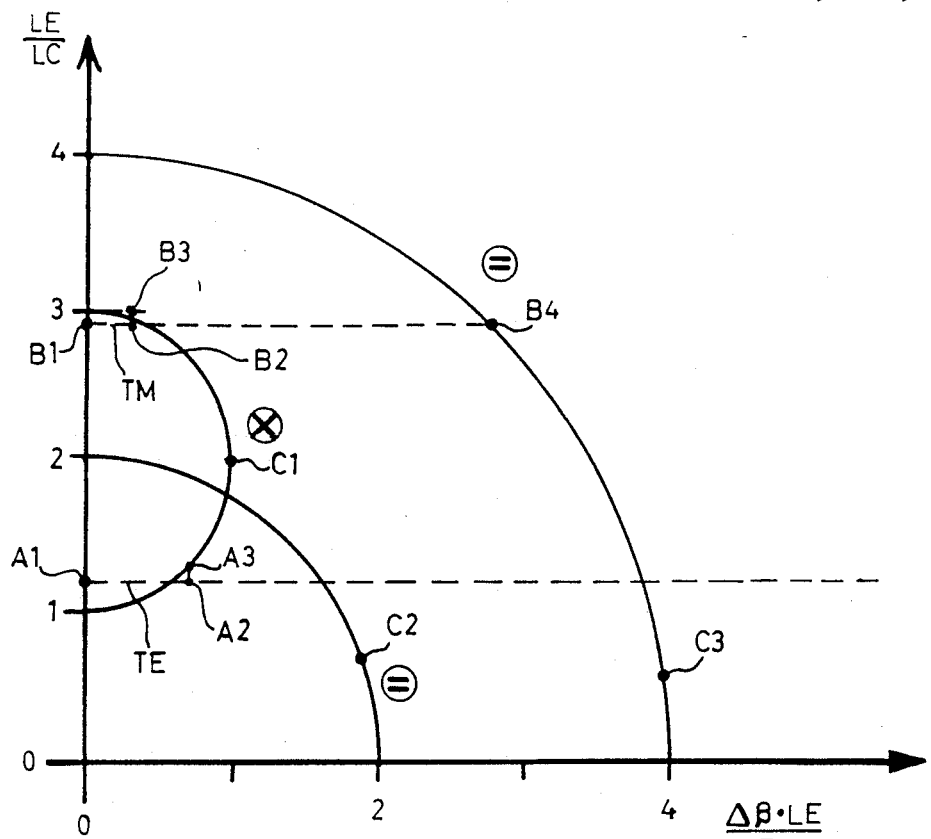

The function of the inventive coupler described above will now be described with reference to an article in IEEE Journal of Quantum Electronics, Vol. QE-12, No. 7, July 1976, pp 396-401, H. Kogelnik and R. V. Schmidt; "Switched Directional Couplers with Alternating $\Delta\beta$". In FIG. 4 of this article there is a diagram describing the principle for coupling between the waveguides in a directional coupler with two electrode sections. The single crystal wafer of the directional coupler described in the article has an orientation of the crystal axes X, Y, Z deviating from the crystal orientation described above for the directional coupler according to FIG. 2. However, the diagram is also applicable, at least in principle, to the present directional coupler and a corresponding diagram is illustrated in FIG. 6. Here the abscissa is graded in standardized units where $\Delta\beta$ denotes the mentioned missmatch in the light propagation constants in the waveguides. LE denotes the interaction region effective length, with LE between L1 and L2, and LC on the ordinate denotes the coupling length. A curve C1 indicates the positions in the diagram for which the directional coupler is in its crossover state, which is denoted by a symbol $\otimes$ against the curve C1. Two curves C2 and C3 indicate the positions in the diagram for which the coupler is in its straight-through or bar state, which is indicated by a symbol $\ominus$. The TE and TM mode polarizations of the incoming lightwave P according to FIG. 1 have different crossover lengths, as mentioned above. For the inventive coupler LE is selected somewhat greater than the crossover length LC for the TE mode. This is denoted by a point A1 in FIG. 6 and the corresponding position for the TM mode is indicated by a point B1. In the example illustrated in the figures, LE/LC=1,2 for the TE mode and LE/LC=2,9 for the TM mode. All the electrodes 5-10 are at no volts at the points A1 and B1. Both TE mode and TM mode for the incoming lightwave P on the waveguide 3 are crossed to a certain extent to the waveguide 4, while a portion of the lightwave remains in the waveguide 3. To obtain complete crossover to the waveguide 4, i.e. the crossover state, the voltage sources 12-17 (according to FIG. 2) are connected to the electrodes. The voltage sources 12 and 15 then have a voltage V0, which shifts the state of the coupler via the $\Delta\beta$ modulation to a point A2 for the TE mode and a point B2 for the TM mode. These shifts have different magnitudes for both modes, depending on different magnitudes of the r coefficients according to the abovementioned reference in the Journal of Optical Communications. In the present coupler of X-cut lithium niobate the r coefficient for the TM mode has the magnitude $r_{13}=10\times10^{-12}$ m/V while the corresponding coefficient for the TE mode is $r_{33}=30\times10^{-12}$ m/V for light with a wavelength of the magnitude 1 $\mu$m. The voltage sources 13, 14, 16 and 17 have a voltage 1/2V1 and by the $\Delta H$ modulation shift the coupler state to a point A3 for the TE mode, and to a point B3 for the TM mode. The points A3 and B3 are both on the curve C1 for the crossover state. By suitable adjustment of the voltage V0 and V1 and the crossover state can be arrived at with very small crosstalk between the waveguides 3 and 4. To reach the bar state, the voltages of the voltage sources 12 and 15 are increased to a value V2, and the voltage sources 13, 14, 15, 16 and 17 are short-circuited. The coupler state is thus shifted to a point B4 for the TM mode on the curve C3. The bar state of the coupler for the TE mode is described with reference to FIG. 7. This figure shows a diagram corresponding to the diagram in FIG. 6 with boundary lines CN for the combined region, in which the coupler is in the crossover state with a crosstalk of less than −20 dB. This region has been denoted by shading closest to the abscissa in FIG. 7. The graduation of the axes follows the graduation according to FIG. 6, and the curves C2 and C3 are drawn in. The state of the TE mode is shifted to a point A4, the distance A1-A4 being about three times as much as the distance B1-B4, depending on the magnitude of the r coefficients, as mentioned above. The coupler has been set in its bar state solely by the use of $\Delta\beta$ modulation. $\Delta H$ modulation can also be used for this state, e.g. to shift the state for the TE mode from the point A4 to a point A5 with less crosstalk.

Figure 7:
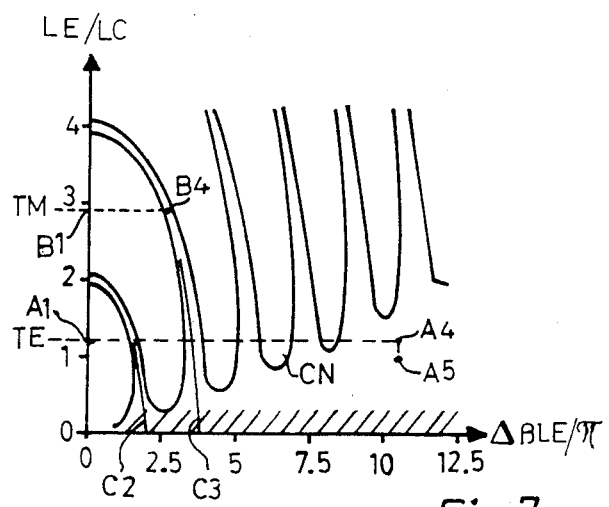
Figure 8:
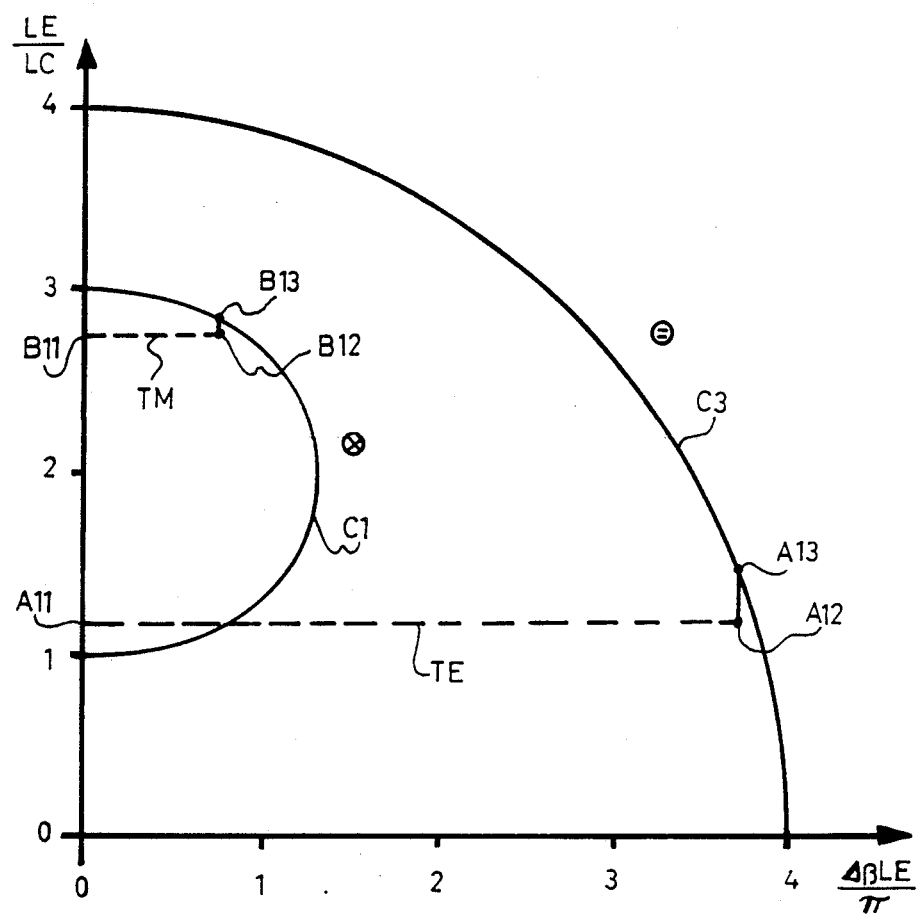
FIG. 8 shows diagrams of the coupling states of the directional coupler in FIG. 1.

In connection with the FIGS. 6 and 7 has been described how the coupler is utilized as a polarization independent coupler. Both the TE- and TM modes are crosscoupled totally between the waveguides 3 and 4. The inventive coupler can also be utilized for polarization splitting of the lightwave P between the waveguides 3 and 4 as will be described below in connection with FIG. 8. The TE and TM mode polarizations of the incoming lightwave P according to FIG. 1 have different crossover lengths, as mentioned above. For the inventive coupler, LE is selected somewhat greater than the crossover length LC for the TE mode. This is denoted by a point A11 in FIG. 8 and the corresponding position for the TM mode is indicated by a point B11. In the example illustrated in the figures, LE/LC=1,2 for the TE mode and LE/LC=2,7 for the TM mode. All the electrodes 5-10 are at no volts at the points A11 and B11. Both TE mode and TM mode for the incoming lightwave P on the waveguide 3 are crossed to a certain extent to the waveguide 4, while a portion of the lightwave remains in the waveguide 3. To obtain complete crossover of the TM mode to the waveguide 4, and complete bar state for the TE mode in the waveguide 3, the voltage sources 12-17 (according to FIG. 2) are connected to the electrodes. The voltage sources 12 and 15 then have a voltage V10, which shifts the state of the coupler via the $\Delta\beta$ modulation to a point A12 for the TE mode and a point B12 for the TM mode. These shifts have different magnitudes for both modes, depending on different magnitudes of the r coefficients according to the above-mentioned reference in the Journal of Optical Communications. In the present coupler of X-cut lithium niobate the r coefficient for the TM mode has the magnitude $r_{13}=10\times10^{-12}$ m/V while the corresponding coefficient for the TE mode is $r_{33}=30\times10^{-12}$ m/V for light with a wavelength of the magnitude 1 $\mu$m. The voltage sources 13, 14, 16 and 17 have a voltage V11 and by the $\Delta H$ modulation shift the coupler state to a point A13 for the TE mode, and to a point B13 for the TM mode. The point A13 is on the curve C1 for the bar state and the point B13 is on the curve C1 for the crossover state. By suitable adjustment of the voltages V10 and V11 a polarization split can be arrived at with very small crosstalk between the waveguides 3 and 4. The exact magnitude of the voltages V10 and V11 can be searched for by an iterative method, where the outgoing intensities of the TE and TM modes in the respective waveguides 3 and 4 are measured and the voltages V10 and V11 are changed with guidance from the diagram in FIG. 8.

Figure 9:
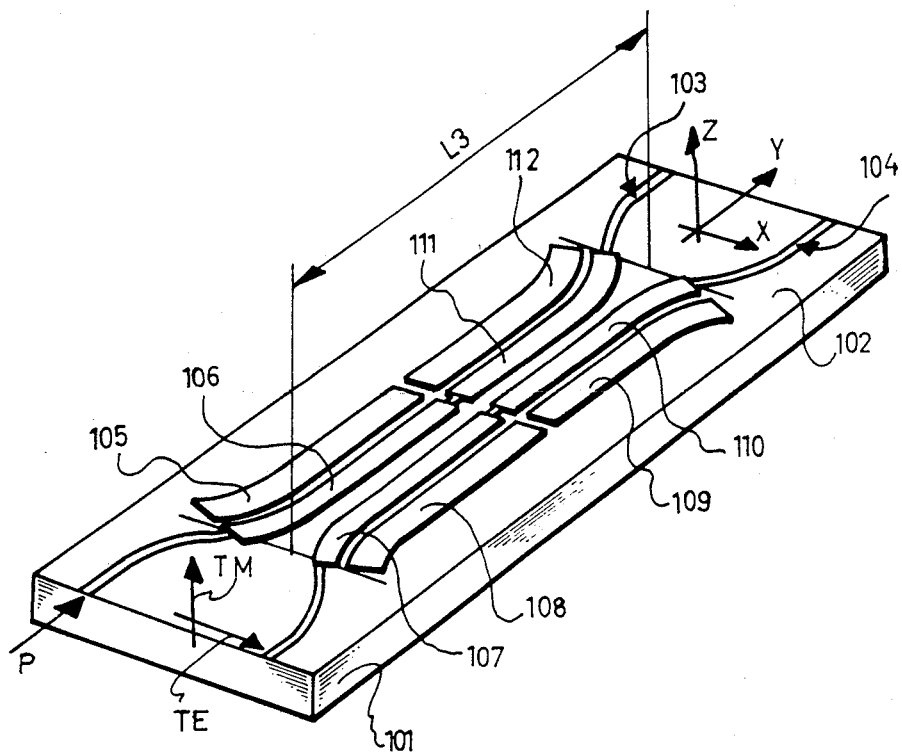
FIG. 9 is a perspective view seen from above illustrating a further directional coupler.

An alternative embodiment of the coupler in accordance with the invention with alternative orientation of the crystal directions is schematically illustrated in perspective in FIG. 9. A single crystal wafer 101, e.g. of lithium niobate or lithium tantalate, has two optical waveguides 103 and 104 on its upper surface 102. The coupler has eight electrodes denoted by the numerals 105-112 in an elongate interaction region with a length L3, the waveguides lying relatively close to each other in this region. The lightwave P incident in the input of the waveguide 103 can be coupled to the output of either the waveguide 103 or 104 or have its polarization split between the waveguides 103 and 104 with the aid of the electrodes, as will be described in detail below. The XYZ coordinate system denotes the crystal directions of the wafer 101.

Figure 10:
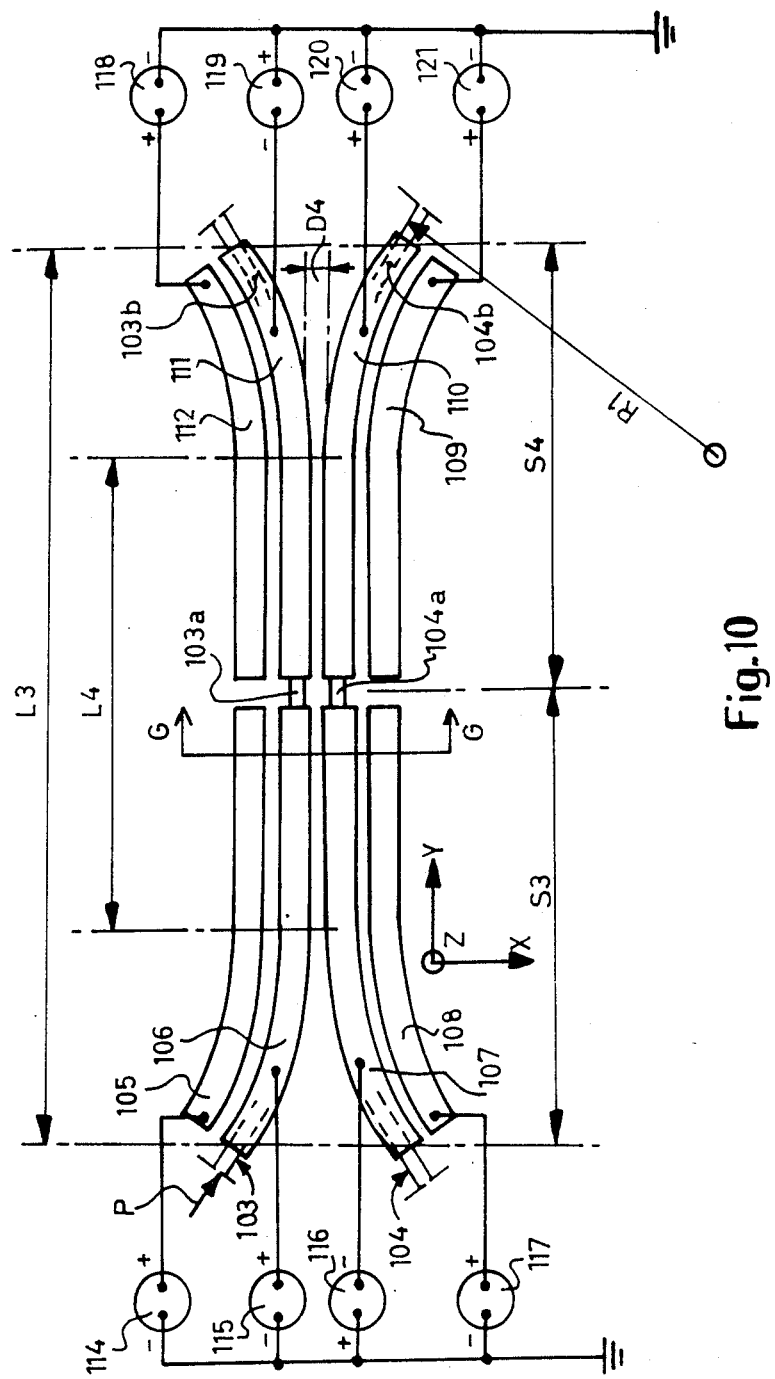
FIG. 10 illustrates the interaction region for the coupler in FIG. 9 in a plan view from above, with electrodes and waveguides.

FIG. 10 show in more detail the appearance of the electrodes and waveguides in the interaction region for the directional coupler in the alternative embodiment. The central portion of the interaction region, this region having a length of L4, contains the portions 103a and 104a of the light waveguides 103 and 104, these portions being mutually parallel. The space between the waveguide portions 103a and 104a has a width D4 in the central portion of the interaction region. At both ends of this region the waveguides 103 and 104 have arcuate parts 103b and 104b diverging outwards. The arcuate parts 103b and 104b are here in the form of circular arcs with a radius R1. Of the eight electrodes 105-112, four inner electrodes 106, 107, 110 and 111, lie over the waveguides 103 and 104, two outer electrodes 105 and 112 are on one side and two outer electrodes 108 and 109 on the other side of both waveguides. The electrodes are mirror-symmetrical about a centre line through the interaction region transverse the parallel portions 103a and 104a of the waveguides. This centre line divides the electrodes into two sections S3 and S4, with one section at each end of the interaction region.

Figure 11:
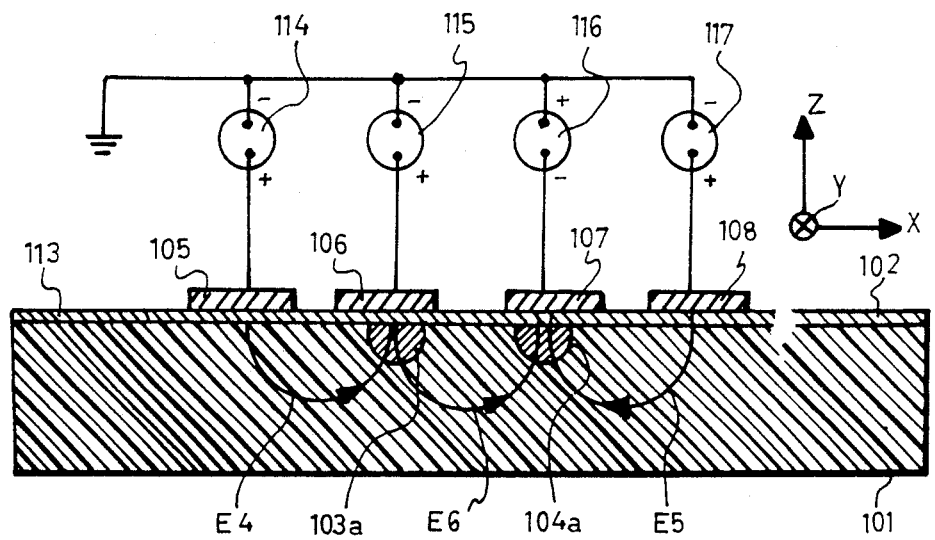
FIG. 11 is a cross section through the interaction region of the coupler in FIG. 9, FIGS. 12a, 12b and 12c are diagram describing electric fields through the waveguides of the coupler in FIG. 9, and FIG. 13, FIG. 14

In FIG. 11 there is a cross section of the coupler according to FIGS. 9 and 10. The cross section is taken in a section G—G through the electrodes 105, 106, 107 and 108, and through the parallel portions 103a and 104a of the waveguides 103 and 104. As mentioned, these are indiffused in the upper surface of the wafer 101, this surface being coated with a buffer layer 113 of such as quartz. The electrodes of the coupler lie above the buffer layer 113 and one electrode section S3 containing the electrodes 106-108 is illustrated in the figure. A voltage source 114 and a voltage source 117 are connected by their negative poles to earth and by their positive poles respectively to the outer electrodes 105 and 108. A voltage source 115 is connected by its negative pole to earth and by its positive pole to the inner electrode 106, and a voltage source 116 is connected by its positive pole to earth and by its negative pole to the inner electrode 107. With the aid of the electrodes the voltage sources generate electrical fields E4, E5 and E6, which are substantially directed in the direction of the optical axis Z through the waveguides 103 and 104. The electrodes 109-112 in the other electrode section S4 are connected to voltage sources, as illustrated in FIG. 10. A voltage source 118 and a voltage source 121 are connected by their negative poles to earth potential and by their positive poles respectively to the outer electrodes 112 and 109. A voltage source 119 is connected by its positive pole to earth and by its negative pole to the inner electrode 111, and a voltage source 120 is connected by its negative pole to earth and by its positive pole to the inner electrode 110. These voltage sources generate electrical fields through the waveguides 103 and 104 in a corresponding way as the voltage sources 114-117, according to the description above pertaining to FIG. 11.

Figure 12A:
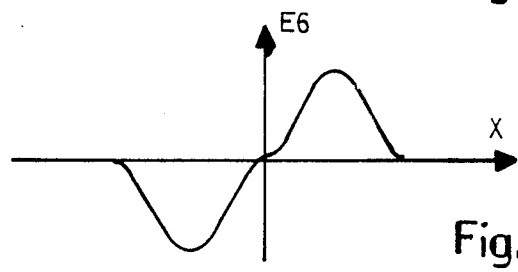
Figure 12B:
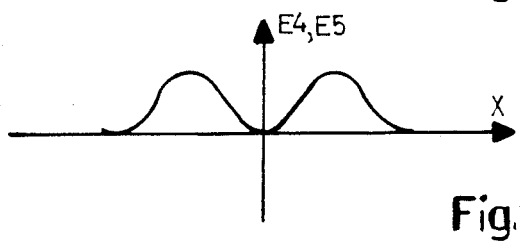
Figure 12C:
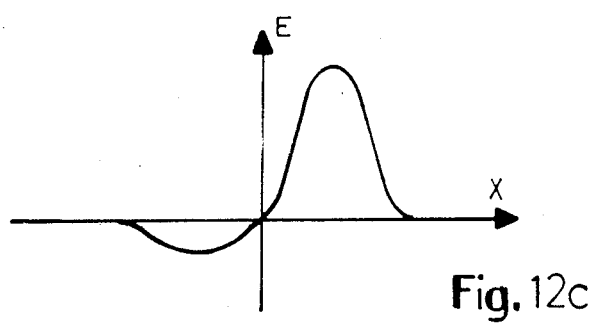

In FIG. 12a there is more closely illustrated the appearance of the electrical field E6 in the waveguide portions 103a and 104a. FIG. 12b illustrates the appearance of the electrical fields E4 and E5 in these waveguides, and FIG. 12c illustrates the sum field E of the electrical fields E4, E5 and E6. The direction of the abscissa in the three diagrams coincides with the above-mentioned X axis. The electrical field E6, which is generated by the voltage sources 115 and 116, achieves an asymmetric disturbance of the light propagation constants in the waveguides, and the fields E4 and E5 achieve an even disturbance. The illustrated electrical fields E4, E5 and E6 in the coupler section S3 are corresponded to by electrical fields in section S4, where the voltage sources 119 and 120 here have reversed polarity to the voltage sources 115 and 116 in section S3.

Figure 13:
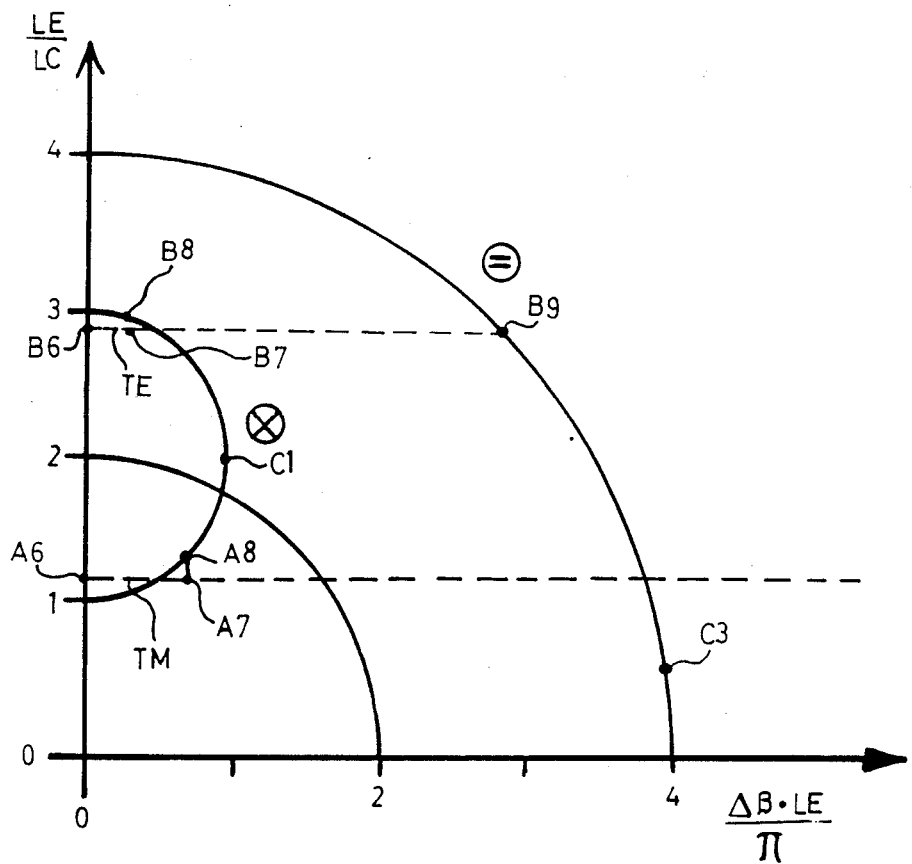
Figure 14:
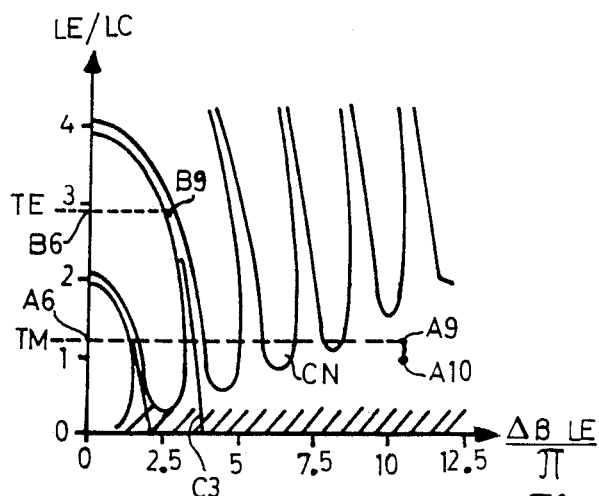
Figure 15:
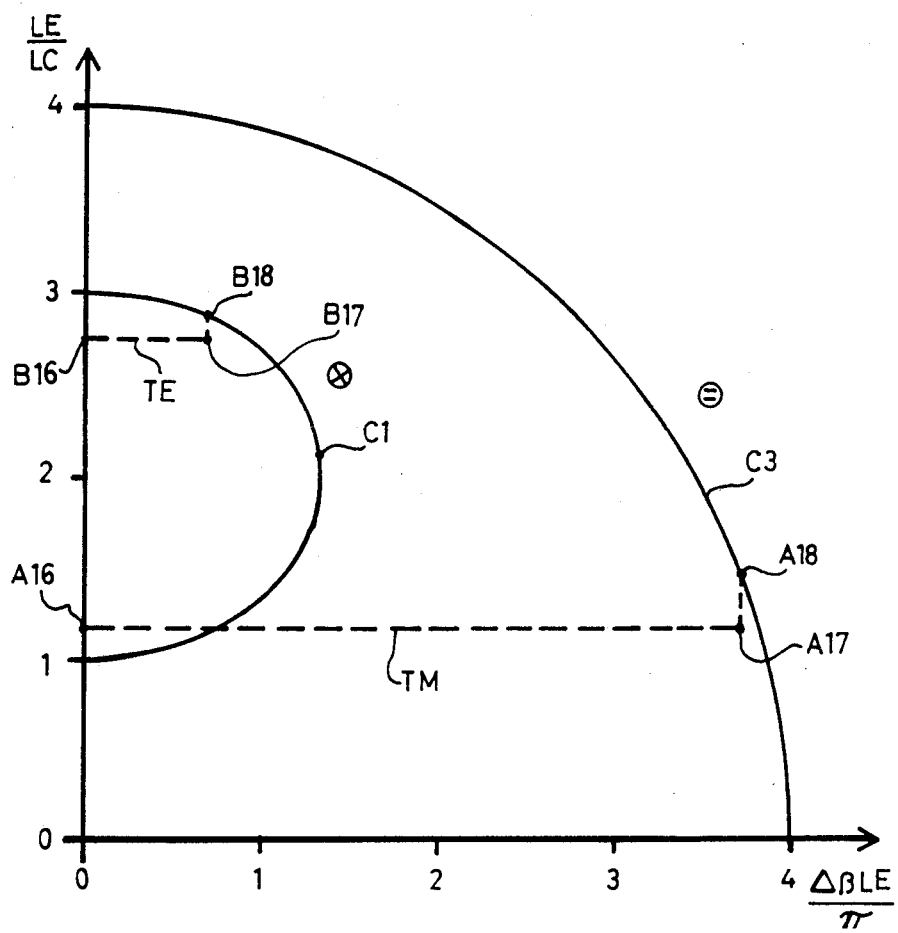
FIG. 15 shows diagrams of coupling states for the coupler in FIG. 9.

The function of the coupler in the FIGS. 9, 10 and 11 will be described below in connection with diagrams in FIGS. 13, 14 and 15. Those diagrams have the same denotations on the axes as the diagram in FIG. 6. The TE and TM mode polarizations of the incoming lightwave P, according to FIG. 9, have different crossover lengths, as mentioned above. For the inventive coupler LE is selected somewhat greater than the crossover length LC for the TM mode. This is denoted by a point A6 in FIG. 13 and the corresponding position for the TE mode is indicated by a point B6. In the example illustrated in the figures, LE/LC=1,3 for the TM mode and LE/LC=2,7 for the TE mode. All the electrodes 105-112 are at no volts at the points A6 and B6. Both TE mode and TM mode for the incoming lightwave P on the lightwave 103 are crossed to a certain extent to the waveguide 104, while a portion of the lightwave remains in the waveguide 103. To obtain complete crossover to the waveguide 104, i.e. the crossover state, the voltage sources 114-121 (according to FIG. 10) are connected to the electrodes. The voltage sources 115, 116, 119 and 120 then have a voltage V5, which shifts the state of the coupler via the $\Delta\beta$ modulation to a point A7 for the TM mode and a point B7 for the TE mode. These shifts have different magnitudes for both modes, depending on different magnitudes of the r coefficients, according to the above-mentioned reference in the Journal of Optical Communications. In the present coupler of Z-cut lithium niobate the r coefficient for the TE mode has the magnitude $r_{13}=10\times 10^{-12}$ m/V while the corresponding coefficient for the TM mode $r_{33}=32\times 10^{-12}$ m/V for light with a wavelength of the magnitude 1 $\mu$m. The voltage sources 114, 117, 118 and 121 have a voltage V6 and by the $\Delta H$ modulation shift the coupler state to a point A8 for the TM mode, and to a point B8 for the TE mode. The points A8 and B8 are both on the curve C1 for the crossover state. By suitable adjustment of the voltages V5 and V6 the crossover state can be arrived at with very small crosstalk between the waveguides 103 and 104. The exact magnitudes of the voltages V5 and V6 can be searched for by an iterative method, in which the departing light intensity for the TM modes is measured, and the voltages V5 and V6 are changed with guidance from the diagram in FIG. 13. To reach the crossover state, the polarity of the voltage sources 119 and 120 is reversed, the voltage of the voltage sources 115, 116, 119 and 120 is increased to a value V7, and the voltage sources 114, 117, 118 and 121 are short-circuited. The coupler state is thus shifted to a point B9 for the TE mode on the curve C3. The bar state of the coupler for the TM mode is described with reference to FIG. 14. This figure shows a diagaram corresponding to the diagram in FIG. 13 with the boundary lines CN for the combined region, in which the coupler is in the crossover state with a crosstalk of less than −20 dB. This region has been denoted by shading closest to the abscissa in FIG. 14. The graduation of the axes follows the graduation according to FIG. 13, and the curves C2 and C3 are drawn in. The state of the TM mode is shifted to a point A9, the distance A6-A9 being about three times as much as the distance B6-B9, depending on the magnitude of the r coefficients, as mentioned above. The coupler has been disposed in its bar state solely by the use of $\Delta\beta$ modulation. $\beta H$ modulation can also be used for this state, e.g. to shift the state for the TM mode from the point A9 to a point A10 with less crosstalk.

Also the coupler in FIG. 9 can be utilized for polarization splitting of the lightwave P between the waveguides 103 and 104 as will be described below in connection with FIG. 15. Both TE and TM mode polarizations of the incoming lightwave P in FIG. 9 have different crossover lengths, as mentioned above. In the inventive coupler, LE is selected to be somewhat larger than the crossover length LC for the TM mode. This is denoted by a point A16 in FIG. 15, and the corresponding position for the TE mode is denoted by a point B16. For the example illustrated in the figures LE/LC=1,2 for the TM mode and LE/LC=2,7 for the TE mode. All the electrodes 105-112 are at no volts at the points A16 and B16. Both TE and TM modes for the incoming lightwave P on the waveguides 103 are crossed over to a certain extent to the waveguide 104, while a part of the lightwave remains in the waveguide 103. To obtain complete crossover of the TE mode to the waveguide 104 and complete bar state for the TM mode in the waveguide 103, the voltage sources 114–121 according to FIG. 10 are connected to the electrodes. The voltage sources 115, 116, 119 and 120 here have a voltage V12, which shifts the coupler state to a point A17 for the TM mode and a point B17 for the TE mode by the $\Delta\beta$ modulation. These shifts have different magnitudes for both modes, as in the previous embodiment example. The voltage sources 114, 117, 118 and 121 have a voltage V13 and shift the state of the coupler to a point A18 for the TM mode and a point B18 for the TE mode via the $\Delta H$ modulation. The point A18 is on the curve C3 for the bar state and the point B18 is on the curve C1 for the crossover state. By a suitable adjustment of the voltages V13 and V12 a polarization split can be achieved in this way with very little crosstalk in the respective polarizations TM and TE between the waveguides 103 and 104. The exact magnitude of the voltages V12 and V13 can be searched for by an iterative method, in which the outgoing light intensity for the TM and TE modes is measured and the voltages V12 and V13 are changed with guidance from the diagram in FIG. 15.

An alternative embodiment of the coupler according to FIGS. 1 and 9 is obtained where the waveguides are straight and parallel over the whole of the interaction region. The weighted crossover between the waveguides is not utilized here and the size of the region in FIGS. 7 and 14 with crosstalk less than −20 dB will be smaller. In further embodiments the configuration of the electrodes deviates from that illustrated in FIG. 2 and FIG. 10. The electrode 5 in FIG. 2 can be connected to the electrode 10, while the electrode 7 is connected to the electrode 8. The central electrodes 6 and 9 can also be connected to each other if the outer electrodes 5, 10 and 7, 8 are divided in the sections S1 and S2 as illustrated in FIG. 2. The edges of the electrodes can also be permitted to project out over the waveguides so that a narrow edge portion of the waveguides is covered. The electrode 105 in FIG. 10 can be connected to the electrode 112, while the electrode 108 is connected to the electrode 109. In correspondance with what has been shown in the above mentioned reference in the Journal of Quantum Electronics 1976, H. Kogelnik and R. V. Schmidt, an inventive directional coupler can have more sections than the two, S1, S2 and S3, S4 wich are respectively illustrated in FIGS. 2 and 10.

The polarization-splitting couplers described in connection with FIGS. 1 and 9 can also be utilized in the inventive method for combining two orthogonally polarized lightwaves into a common ligthwave. In FIG. 1 there is shown a lightwave PTE, which only contains the TE mode, and a lightwave PTM, which only contains the TM mode. The lightwave PTE is incident in the waveguides 3, and is passed straight through to the output of the waveguide 3, as described in connection with FIG. 8. The lightwave PTM is incident in the waveguide 4 and is crossed over to the output of the waveguide 3 in a similar way as described in connection with FIG. 8. Both lightwaves PTE and PTM are combined into a lightwave PEM which is sent from the output of the waveguide 3.

In many applications of couplers it is desirable to distribute an incoming lightwave between the outputs of the coupler with the same amount of energy at both outputs, so-called 3 −dB crossover. Such distribution can take place with the aid of the above-mentioned coupler. The voltage sources 12 and 15, according to FIG. 2, have a pole voltage V3 here, which achieves a $\Delta\beta$ modulation and the voltage sources 13, 14, 15, 16 and 17 have a pole voltage V4 which achieves an $\Delta H$ modulation. By suitable selection of the polarity and magnitude of the voltages V3 and V4 the state of the coupler can be shifted to a state with 3 −dB crossover for both TE and TM modes in the incoming lightwave P. Other desirable coupling states can be achieved by selection of the pole voltages and polarities of the voltage sources, the polarities generally deviating from those illustrated in FIG. 2. Also the coupler in FIG. 9 and 10 can in a corresponding way be disposed for 3 −dB coupling.

A lithium niobate coupler of the alternative embodiment with straight waveguides in the entire interaction region and with orientation of the chrystal axes as in FIG. 1 has been investigated experimentally. For this coupler the length L1=10 mm, L1/Lc=1,2 for the TE mode and L1/LC=3,1 for the TM mode. Crosstalk wass less than −24 dB for both modes in both crossover and bar states. The crossover state was arrived at for the voltages V0=2 V and V1=30 V and the bar state was arrived at the voltage V2=20 V.

The couplers described above has several advantages compared with known polarization-splittng or polarization-independent couplers. The waveguides in directional couplers are normally arcuate at their ends outside the interaction region, for increasing the distance and inhibiting crossover between the waveguides. These arcuate parts of the waveguides can be utilized in accordance with the invention to provide a directional coupler with low crosstalk. Manufacture of the electrodes with the manufacturing aids available in normal production is facilitated by using cirular arcs for the arcuate parts. Requirements on manufacturing accuracy can be less demanding, since the bar state, and above all the crossover state, for both TE and TM modes can be adjusted while utilizing both $\Delta\beta$ and $\Delta H$ modulation. The voltages required between the electrodes of the coupler for this are relatively small. This advantage is achieved by selecting the crystal orientation of the single crystal wafer such that the r coefficients used for changing the propagation of the light have large values. The coupler electrodes are placed beside the waveguides. This results in the advantage that the buffer layer 11 of the coupler can be excluded if a suitable material e.g. indium tin oxide is selected for the electrodes. Electrodes made in this way only cause normal attention of the lightwave in the waveguides, in spite of there being no buffer layer.

I claim:

1. A method of operating a polarization directing optoelectronic coupler, including a single crystal wafer of doubly refracting material with an optical axis, an elongate interaction region at the upper surface of the wafer divided into at least two transverse sections, two optical waveguides extending in the interaction region at mutual spacing in the longitudinal direction thereof, and an electrode means arranged in the interaction region, the electrode means in each of the sections having at least three electrodes extending along the waveguides over substantially the entire length of their respective section and having connections for electrical voltage sources, the optical axis being directed in the transverse direction of the waveguides, with the latter extending in the Y direction of the crystal for switching lightwaves, the orthogonal polarization directions of which have arbitrary mutual strengths, said method comprising the steps of:

generating a first electrical field in said waveguides between said at least three electrodes, said first field being substantially parallel to the optical axis and having the same direction in each of the at least two sections and in both of said two waveguides for changing the coupling length of the coupler;

generating a second electrical field in said waveguides between said at least three electrodes, said second field being substantially parallel to the optical axis and having a direction in one of said waveguides which is counter to the direction of the second electrical field in a second of said waveguides in the same section, for changing the difference between the propagation constants ($\Delta\beta$) of the waveguides; and wherein the field strengths of the first and the second electrical fields are selected such that both orthogonal polarization directions TE, TM of the light are individually switched over to a desired amount between said waveguides.

2. The method of operating an optoelectronic coupler as claimed in claim 1, wherein the step of generating said second electrical field comprises disposing said second electrical field such that its direction in one of the waveguides in one of the sections is the reverse of its direction in the same waveguide in an adjacent section.

3. The method of operating an optoelectronic coupler as claimed in claim 1, wherein the optical axis is substantially at right angles to the upper surface of the wafer and each of the sections has an inner electrode over each of the waveguides and an outer electrode on either side of the waveguides, wherein the step of generating said first electrical field comprises generating, in each section, said first electrical field between each of the inner electrodes and the respective adjacent outer electrode, and the step of generating said second electrical field comprises generating, in each section, said second electrical field between the two inner electrodes.

4. The method of operating an optoelectronic coupler as claimed in claim 1, wherein the optical axis is in the plane of the upper surface of the wafer and each of the sections has a central electrode in the space between the waveguides and an outer electrode on either side of the waveguides, wherein the step of generating said first electrical field comprises generating, in each section, said first electrical field between the outer electrodes, and the step of generating said second electrical field comprises generating, in each section, said second electrical field between the central electrode and the outer electrodes.

5. The method of operating an optoelectronic coupler as claimed in claim 1, wherein the field strength of said first and said second electrical fields are selected such that the light with one of the polarization directions is crossed over between the waveguides and light with the other of the polarization direction remains in one of the waveguides.

6. The method of operating an optoelectronic coupler as claimed in claim 2, wherein the field strength of said first and said second electrical fields are selected such that the light with one of the polarization directions is crossed over between said waveguides and light with the other of the polarization directions remains in one of said waveguides.

7. The method of operating an optoelectronic coupler as claimed in claim 3, wherein the field strength of said first and said second electrical fields are selected such that the light with one of the polarization directions is crossed over between said waveguides and light with the other of the polarization directions remains in one of the waveguides.

8. The method of operating an optoelectronic coupler as claimed in claim 4, wherein the field strength of said first and said second electrical fields are selected such that the light with one of the polarized directions is crossed over between said waveguides and light with the other of the polarization directions remains in one of the waveguides.

9. A polarization directing optoelectronic coupler comprising:

a single crystal wafer of doubly refracting material with an optical axis;

an elongate interaction region at the upper surface of the wafer divided into at least two transverse sections;

two optical waveguides extending in the interaction region at mutual spacing in the longitudinal direction thereof;

an electrode means arranged in the interaction region, the electrode means in each of the sections having at least three electrodes extending along said waveguides over substantially the entire length of their respective section and having connections for electrical voltage sources, the optical axis being directed in the transverse direction of said waveguides and said waveguides extending in the Y direction of the crystal, for switching lightwaves, the orthogonal polarization directions of which have arbitrary mutual strengths;

said voltage sources being operable to generate a first electrical field between said electrodes, said first field in said waveguides being substantially parallel to the optical axis and having the same direction in all of the sections and in both said waveguides, for changing the crossover length of the coupler, and being operable to generate a second electrical field between said electrodes, which in said waveguides is substantially parallel to the optical axis and has a direction in one of the waveguides which is counter to the direction of the second electrical field in the other waveguide in one and the same section for changing the difference between the propagation constants ($\Delta\beta$) of the waveguides; and wherein the field strength of said first and said second electrical fields have a magnitude such that both polarization directions (TE, TM) of the light are individually crossed over to a desired extent between said waveguides.

10. The optoelectronic coupler as claimed in claim 9, wherein the optical axis is substantially at right angles to the upper surface of the wafer and each of the sections has an inner electrode over each of the waveguides and an outer electrode on either side of the waveguides, wherein said voltage sources are operable to generate said first electrical field between each of the inner electrodes and the respective adjacent outer electrode and generate said second electrical field between the two inner electrodes.

11. The optoelectronic coupler as claimed in claim 9, wherein the optical axis is in the plane of the upper surface of the wafer and each of the sections has a central electrode in the space between the waveguides and an outer electrode on either side of the waveguides, wherein said voltage sources are operable to generate said first electrical field between the outer electrodes and generate said second electrical field between the central electrode and the outer electrodes.

12. The optoelectronic coupler as claimed in claim 9, wherein the direction of said second electrical field in one of the waveguides in one of the sections is counter to its direction in the same waveguide in an adjacent section.

13. The optoelectronic coupler as claimed in claim 9, wherein said waveguides have portions that are parallel in the central portion of the interaction region, said waveguides also having end parts at either end of the interaction region which are arcuate, the contour of the electrodes conforming to the contour of the waveguides.

14. The optoelectronic coupler as claimed in claim 9, wherein said waveguides are straight and mutually parallel over the entire length of the interaction region.

15. The optoelectronic coupler as claimed in claim 10, wherein the direction of said second electrical field in one of the said waveguides in one of the sections is counter to its direction in the same waveguide in an adjacent section.

16. The optoelectronic coupler as claimed in claim 11, wherein the direction of said second electrical field in one of said waveguides in one of the sections is counter to its direction in the same waveguide in an adjacent section.

17. The optoelectronic coupler as claimed in claim 10, wherein said waveguides have portions that are parallel in the central portion of the interaction region, said waveguides also having end parts at either end of the interaction region which are arcuate, the contour of said electrodes conforming to the contour of said waveguides.

18. Optoelectronic coupler as claimed in claim 11, wherein said waveguides have portions that are parallel in the central portion of the interaction region, said waveguides also having end parts at either end of the interaction region which are arcuate, the contour of said electrodes conforming to the contour of said waveguides.

19. Optoelectronic coupler as claimed in claim 12, wherein said waveguides have portions that are parallel in the central portion of the interaction region, said waveguides also having end parts at either end of the interaction region which are arcuate, the contour of said electrodes conforming to the contour of said waveguides.

* * * * *